Figure 1:
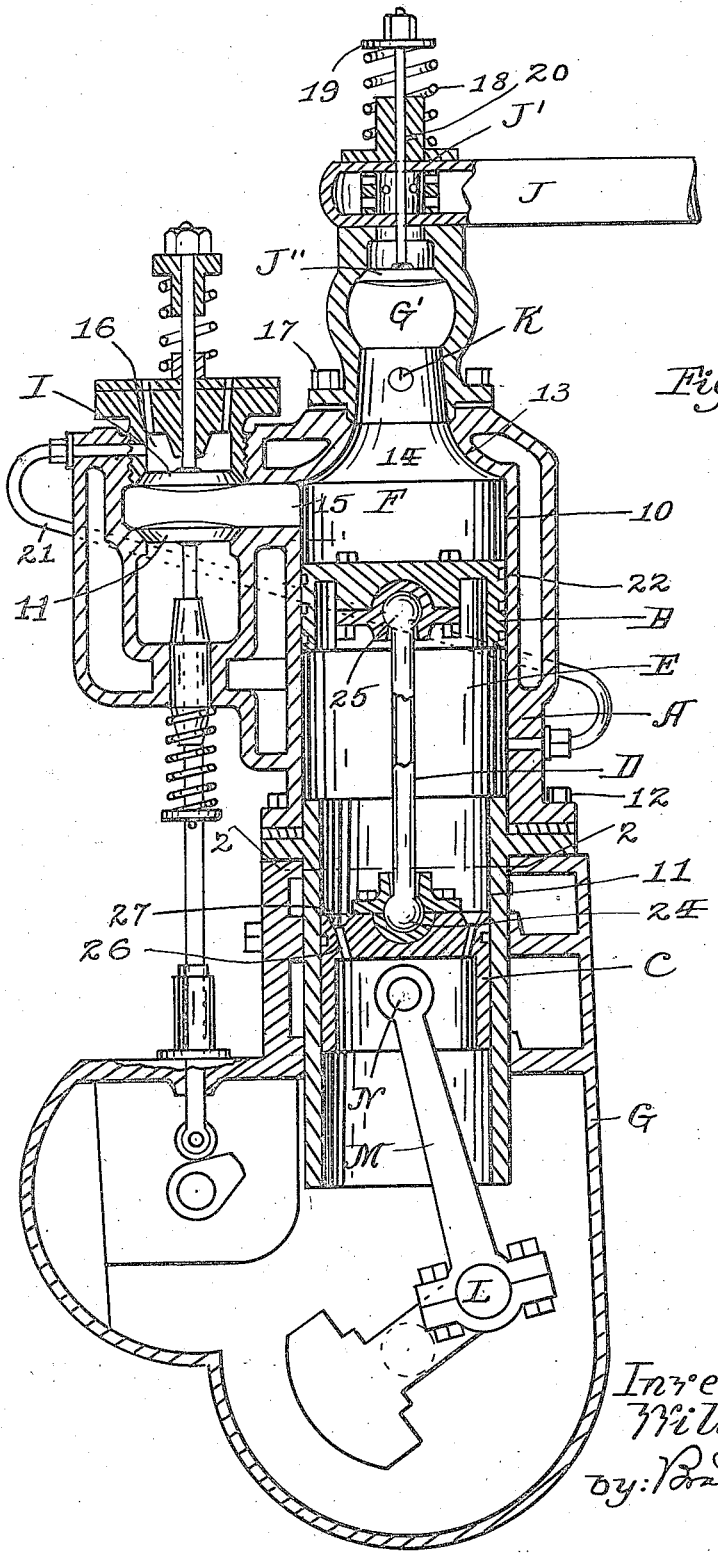

Aug. 20, 1935.   W. A. SORG   2,011,833

INTERNAL COMBUSTION ENGINE

Filed April 29, 1926

Inventor:
William A. Sorg,
by: Bradbury & Caswell,
Attorneys.

Patented Aug. 20, 1935

2,011,833

UNITED STATES PATENT OFFICE 2,011,833

INTERNAL COMBUSTION ENGINE

William A. Sorg, Owosso, Mich.

Application April 29, 1926, Serial No. 105,378

10 Claims. (Cl. 123—196)

My invention relates to internal combustion engines, and more particularly to the piston assembly thereof, and has for its object to provide a piston which will not wear the cylinder out of round.

Another object of the invention resides in employing in conjunction with the power piston a cross head piston to which a connecting rod is pivoted movable in the same direction as the power piston, and in providing a flexible connection between the power piston and cross head piston to permit the power piston to float within the cylinder.

Another object of the invention resides in employing a piston rod for connecting the power piston and cross head piston, and in further employing one or more ball and socket joints or other mechanical equivalent for connecting said piston rod to said pistons.

A still further object of the invention resides in providing a construction in which friction between the working parts of the engine is greatly reduced through effective lubrication thereof.

An object of the invention resides in forming a traveling oil vapor chamber between the power piston and cross head and in further providing means for injecting into said chamber a mist of oil for the lubrication of the proximate parts.

Another object of the invention resides in arranging said ball and socket joints within said chamber to procure proper lubrication thereof.

A still further object of the invention resides in constructing the cross head piston smaller in diameter than the power piston so as to cause said pistons to have a pump action within said chamber, and in further connecting said chamber with the crank case for drawing a mist of oil into the chamber.

It is well known that in the ordinary type of internal combustion engine, efficiency depends to a large extent on the roundness and the smoothness of the cylinder wall which comes in contact with the piston; and that after the engine has run for a certain length of time the cylinder becomes ovular, so that there is no longer a good gas tight fit between the piston and cylinder and the power output is decreased, the compression is below normal, the engine starts hard, the piston slaps and gases blow past the rings.

By means of my improved construction, I eliminate or minimize these defects in the following manner: first, by introducing a novel cross head which takes the thrust of the connecting rod; second, by connecting the piston to the cross head in a novel maner so that none of the wobble or movement of the cross head is transmitted to the piston; third, by causing the piston to float within the cylinder, favoring neither one side of the cylinder or the other, thereby reducing friction to a minimum; and finally, by producing a construction of the type disclosed, whereby the parts are most effectively lubricated.

To these ends, my invention comprises the features of construction and combination of parts hereinafter described and claimed.

Figure 2:
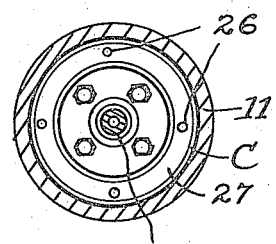

In the accompanying drawing forming part of this specification, Fig. 1 is a vertical central sectional view of an internal combustion engine showing my improvements applied thereto, and Fig. 2 is a cross sectional view of the cross head and guide taken on line 2—2 of Fig. 1.

In the drawing, A indicates the cylinder of an internal combustion engine, B a reciprocating power piston provided with rings 22, C a compression cross head or piston and D a hollow piston rod which connects the power and cross head pistons in tandem and spaced apart, causing them to reciprocate in unison and creating a traveling chamber E in the cylinder between the same. The cylinder is made in two parts 10 and 11, the upper end of part 10 being formed with a combustion chamber F and the lower part 11 resembling a sleeve which may be case hardened, and the two members being secured together and to the crank case G by bolts 12 or any other suitable means. The upper end of the cylinder is tapered at 13 to form a restricted neck 14 and a laterally disposed passage 15 is connected with the upper end of the cylinder to act as an exhaust for spent gases from the combustion chamber and to admit fresh air from an air chamber 16 into the cylinder during the respective exhaust and intake strokes of the power or trunk piston. A mechanically actuated exhaust valve H working in synchronism with the power piston performs the function of exhausting the spent gases in the usual manner and an automatically operating air valve I, in the air chamber 16, admits a predetermined amount of fresh air during each intake stroke to promote combustion of the fuel after ignition.

Situated immediately above the neck 14 of the cylinder is a vaporizing chamber G' which is secured to the cylinder by bolts 17 or any other suitable means. Upon this vaporizing chamber and connected thereto is a fuel manifold J, having a fuel atomizing chamber J', with a fuel intake valve J'' therebelow and controlling the even admission and distribution of fuel over the walls of the fuel chamber. A spark plug K is located near the top of the vaporizer. The valve J" is shown closed automatically by the expansion spring 18 seated between the atomizer and the washer 19 on the valve stem 20 but the means for operating the valve may be of any suitable construction desired.

The ends of the hollow piston rod are connected to the power or trunk piston and to the cross head piston by ball and socket joints 24 and 25. These joints relieve all side strain from the pistons by their free movement and allow them to play freely in the cylinder. This feature reduces friction between the pistons and cylinder wall. Holes 26 drilled through the head of the cross head piston C, conduct oil mist from the crank case into the suction chamber E for lubricating purposes.

The cross head piston C is connected with the crank shaft L by means of the connecting rod M, the piston pin N by which the connecting rod is secured to the cross head piston being high up in the piston in a position to be lubricated by oil passages 26. By the use of a cross head piston and of the universal joints between the pistons B and C and connecting rod D, side wobble and uneven wear of the power or trunk piston in the cylinder is prevented and the power piston has a free floating action in the cylinder.

A cup or annular groove 27 in the upper end of piston C collects oil from the cylinder wall which oil in turn is conducted by the ducts 26 downwardly upon the piston pin to thoroughly lubricate the latter. A tube 21 brings the chamber E into communication with the chamber 16.

As will be noted in the drawing, the cylinder section 11 is of smaller diameter than the cylinder proper 10 which forms in effect a suction chamber indicated at E between the piston proper B and the cross head C. During the compression and exhaust strokes of the engine the lubricant in mist form is drawn through the apertures 26 and into the chamber E, due to the fact that the pressure in the crank case is greater than that in said chamber. This mist lubricates the ball and socket joints 24 and 25. During the explosion and suction strokes a certain portion of the mist is forced back again into the crank case, but a certain part thereof is condensed and falls upon the cross head piston C where it further lubricates the ball and socket joint 24. Part of this oil is collected by groove 27 and drains back into the crank case, a portion thereof reaching the wrist pin N. The mist of oil in chamber E serves to lubricate both parts of the cylinder A and the pistons therein. Due to the pipe 21 a small portion of the mist of oil is discharged into the auxiliary air chamber 16 from which it enters the combustion chamber and is burned. The oil so burned consists of the more volatile part of the mist which includes the fuel passing the piston rings 22. In this manner chamber E is scavenged and proper lubrication procured at all times.

In the operation of the device, all side thrust produced by the connecting rod M is transmitted to the cross head C without effecting the movement of the piston B. The piston B, being flexibly connected to the cross head C through the universal joints 24 and 25, the piston rod D is free to follow the course of the cylinder 10 and thereby causes an even wear upon the walls of said cylinder throughout its extent. This prevents the cylinder from being worn ovular and maintains a perfectly round cylinder, thereby producing a tight fit between the piston and cylinder and a corresponding economy in operation. At the same time, all of the disadvantages of the ordinary type of engine where the connecting rod is pivoted to a structure fixedly connected to the piston are eliminated, giving an extremely efficient and smooth running engine.

Changes and modifications in construction are contemplated within the scope of the following claims.

Having described my invention, what I claim as new and desire to secure by Letters Patent is:

1. An internal combustion engine comprising a cylinder, a power piston within said cylinder, a second cylinder in alignment with and communicating with said first cylinder, a cross head piston in said second cylinder attached to and spaced from said power piston to produce with said cylinders a lubricating chamber between said pistons, a crank shaft, a connecting rod pivoted to said crank shaft, a pin for connecting said rod to said cross head, the upper end of said cross head being formed with a passageway extending downwardly toward said pin for conducting lubricating oil from said lubricating chamber to said pin.

2. An internal combustion engine comprising a cylinder, a power piston within said cylinder, a second cylinder, a cross head in said second cylinder means forming in conjunction with said cross head a lubricating chamber disposed above said cross head and movable with said cross head, a crank shaft, a connecting rod pivoted to said crank shaft, a pin for connecting said rod to said cross head, the upper end of said cross head being formed with a passageway extending downwardly from said lubricating chamber toward said pin for conducting lubricating oil from said chamber to said pin.

3. An internal combustion engine comprising a cylinder, a piston assembly reciprocable along said cylinder and having upper and lower piston sections separated from one another to form a chamber therebetween, a duct connecting the crank case of said engine with said chamber, the upper of said piston sections being larger in diameter than the lower to cause a vacuum in said chamber on the upstroke to draw a mist of oil from the crank case and into said chamber.

4. An internal combustion engine comprising a cylinder, a piston assembly, reciprocable along said cylinder and having upper and lower piston sections separated from one another to form an expansible oil chamber therebetween, a duct connecting the crank case of said engine and said chamber, and means for causing a suction within said chamber to draw a mist of oil from said crank case and into said chamber through said duct.

5. An internal combustion engine comprising a cylinder, a piston assembly reciprocable along said cylinder and having upper and lower piston sections separated from one another to form an expansible oil chamber therebetween, an oil duct connecting the crank case of said engine and said chamber, one of said piston sections being of lesser diameter than the other to cause a partial vacuum within said chamber for drawing a mist of oil from the crank case and into said chamber through said oil duct.

6. An internal combustion engine comprising a cylinder, a piston assembly reciprocable within said cylinder and having upper and lower piston sections separated from one another to form an expansible oil chamber therebetween, a duct leading to said chamber and communicating with an oil reservoir, and means for causing a suction within said chamber to draw oil from said reservoir and into said chamber through said duct.

7. In an internal combustion engine, a cylinder, a power piston reciprocable in said cylinder, a combined piston and cross head in said cylinder spaced from said power piston, a hollow piston rod joined to said power piston and said combined piston and cross head with an intervening universal joint, and means for lubricating said universal joint.

8. In an internal combustion engine, a cylinder, a power piston reciprocable in said cylinder, a combined piston and cross head in said cylinder spaced from said power piston, a piston rod joined to said power piston and said combined piston and cross head with an intervening ball and socket joint, and means for lubricating said ball and socket joint.

9. In an internal combustion engine, a cylinder, a power piston reciprocable in said cylinder, a combined piston and cross head in said cylinder attached to and spaced from said power piston and producing a traveling chamber in said cylinder, a crank shaft, a connecting rod coupled to said crank shaft, a pin connecting said connecting rod to said combined piston and cross head, the upper end of said combined piston and cross head being cupped to receive lubricant and formed with passages extending downwardly to transmit lubricant from said cup to said pin, and a conduit communicating with said traveling chamber and a source of suction for drawing lubricant into the traveling chamber.

10. In an internal combustion engine, a cylinder, a power piston reciprocable in said cylinder, a combined piston and cross head in said cylinder spaced from said power piston to form a traveling chamber, a connection between said power piston and combined piston and cross head, a universal joint in said connection to permit free movement between said connected parts, means communicating with said traveling chamber for lubricating said universal joint, and means for creating suction in said traveling chamber to draw lubricant into said traveling chamber.

WILLIAM A. SORG.